(12) United States Patent
Yang et al.

(10) Patent No.: US 11,552,788 B2
(45) Date of Patent: Jan. 10, 2023

(54) DATA SHARING METHOD, SYSTEM, ELECTRONIC DEVICE AND STORAGE MEDIUM THEREOF

(71) Applicant: Beijing University of Posts and Telecommunications, Beijing (CN)

(72) Inventors: Hui Yang, Beijing (CN); Lin Guan, Beijing (CN); Chao Li, Beijing (CN); Qiuyan Yao, Beijing (CN); Bowen Bao, Beijing (CN); Zhengjie Sun, Beijing (CN); Jie Zhang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 248 days.

(21) Appl. No.: 17/114,752

(22) Filed: Dec. 8, 2020

(65) Prior Publication Data

US 2022/0150057 A1 May 12, 2022

(30) Foreign Application Priority Data

Nov. 11, 2020 (CN) .......................... 202011256399.1

(51) Int. Cl.
*H04L 9/40* (2022.01)
*H04L 9/08* (2006.01)
*G06K 9/62* (2022.01)
*H04L 9/32* (2006.01)
*H04L 9/00* (2022.01)

(52) U.S. Cl.
CPC .......... *H04L 9/0827* (2013.01); *G06K 9/6256* (2013.01); *H04L 9/0825* (2013.01); *H04L 9/3236* (2013.01); *H04L 9/3265* (2013.01); *H04L 63/0823* (2013.01);

(Continued)

(58) Field of Classification Search
CPC ........ H04L 63/0823; H04L 63/10; H04L 9/50
See application file for complete search history.

(56) References Cited

U.S. PATENT DOCUMENTS

2019/0332955 A1\* 10/2019 Manamohan ........ G06K 9/6256
2021/0067339 A1\* 3/2021 Schiatti .................. G06F 16/27
2021/0328804 A1\* 10/2021 Snow .................... H04L 9/0637

OTHER PUBLICATIONS

Nagar Privacy-Preserving Blockchain Based Federated Learning with Differential Data Sharing Dec. 10, 2019 arXiv:1912.04859 (Year: 2019).\*

(Continued)

*Primary Examiner* — David J Pearson
(74) *Attorney, Agent, or Firm* — Westbridge IP LLC

(57) ABSTRACT

Disclosed is a data sharing method, including: building a trust alliance block chain, the trust alliance block chain comprising a main chain and at least one slave chain; each slave chain corresponding to a domain; and each domain comprising a leader node; establishing a virtual slave chain on the trust alliance block chain; designating, by the leader node in each domain, a node as a federated learning node; assigning, by the leader node in each domain, a virtual identity to the federated learning node to join the federated learning node to the virtual slave chain; and performing, by each federated learning node, a joint training on a local federated learning model using data generated in its own domain to establish a public federated learning model, through which data are shared among the domains. The present disclosure further provides a data sharing system, an electronic device and a storage medium.

15 Claims, 6 Drawing Sheets

(52) U.S. Cl.
CPC ............... *H04L 63/10* (2013.01); *H04L 9/50* (2022.05); *H04L 2209/463* (2013.01)

(56) References Cited

OTHER PUBLICATIONS

Kang et al. Scalable and Communication-efficient Decentralized Federated Edge Learning with Multi-blockchain Framework Aug. 10, 2020 arXiv:2008.04743 (Year: 2020).*
Wu Master-slave Blockchain Based Cross-domain Trust Access Mechanism for UPIOT May 15-18, 2020 2020 5th International Conference on Computer and Communication Systems (ICCCS) (Year: 2020).*

* cited by examiner

DATA SHARING METHOD, SYSTEM, ELECTRONIC DEVICE AND STORAGE MEDIUM THEREOF

CROSS-REFERENCE TO RELATED APPLICATIONS

The present application claims priority of Chinese patent application CN202011256399.1 filed on Nov. 11, 2020, the entire contents of which are incorporated herein by reference.

TECHNICAL FIELD

One or more examples of the present disclosure relate to data processing technology, and in particular to a data sharing method, a data sharing system, an electronic device, and a storage medium.

BACKGROUND

With rapid development of various new distributed technologies, the concept of Internet of Things (IoT) has come into public's attention. Devices scattered in different geographic locations and application scenarios are connected through the Internet by sensors to realize data sharing, data exchange and collaborative work of IoT devices. In this way, the performances of the distributed systems and the resource utilization rate of the distributed systems can both be greatly improved. With the increasing number of IoT devices and application scenarios, the concept of "domain" division is put forward and collaborative work of IoT devices can be implemented through inter-domain data sharing. In this way, how to achieve secure cross-domain data sharing has also become a hot topic.

The traditional data sharing is completed in the form of encryption to avoid information leakage. One way of encryption is that two parties who share data directly exchange data through ciphertext. The other way of encryption is that data are encrypted and placed in a centralized manner. A data demander may request and decrypt the data for use. However, it can be seen that data are completely exposed in both the two ways. Moreover, the owner of the data may lose the control of the data, and the data may also be leaked in the sharing process. In addition, with the introduction of some data security bills, such as Data Security Law and General Data Protection Regulation, private data of IoT users are no longer allowed to be directly shared.

At the same time, the efficient operation of the IoT however requires a large amount of data analysis for supporting. Therefore, there is an urgent need to find a solution of data sharing that does not expose any data.

SUMMARY

In view of the above description, one or more examples of the present disclosure propose a data sharing method, which may realize data sharing without exposing any data, thereby security of data can be guaranteed.

The data sharing methods according to the examples of the present disclosure may include: building a trust alliance block chain, wherein the trust alliance block chain comprises a main chain and at least one slave chain; each slave chain corresponds to a domain; and each domain comprises a leader node; establishing a virtual slave chain on the trust alliance block chain; designating, by the leader node in each domain, a node of its own domain as a federated learning node; assigning, by the leader node in each domain, a virtual identity to the federated learning node to join the federated learning node to the virtual slave chain; and performing, by each federated learning node, a joint training on a local federated learning model using data generated in its own domain to establish a public federated learning model, through which data are shared among the domains.

According to the data sharing method, one or more examples of the present disclosure also provide a data sharing system, comprising: a trust alliance block chain and a virtual slave chain; wherein the trust alliance block chain comprises a main chain and at least one slave chain; each slave chain corresponds to a domain, and each domain comprises a leader node; the leader node in each domain designates a node of its own domain as a federated learning node of the domain, assigns a virtual identity to the federated learning node of the domain, and joins the federated learning node to the virtual slave chain; and each federated learning node uses data generated in its own domain to perform a joint training on a public federated learning model, through which data are shared among the domains.

One or more examples of the present disclosure further provides an electronic device, which may comprise: a memory, a processor, and a computer program stored in the memory and running in the processor, wherein the processor implements the data sharing method when executing the program.

One or more examples of the present disclosure further provides a non-transitory computer-readable storage medium, wherein the non-transitory computer-readable storage medium stores computer instructions, and the computer instructions are used to make the computer execute the above data sharing method.

In the data sharing method, each domain joins a federated learning node therein to the established a virtual slave chain, and the federated learning nodes jointly train a public federated learning model. This public federated learning model is equivalent to a machine learning model trained while all the data of each domains are shared. Using the public federated learning model by each domain in the application is equivalent to using all the data of each domain, thereby achieving the effect of data sharing. Moreover, in the above process, data is not truly transmitted between respective domains. Therefore, data exposure or leakage is completely avoided, and security of data can be guaranteed.

BRIEF DESCRIPTION OF DRAWINGS

In order to explain one or more examples of the present disclosure more clearly, accompanying drawings illustrating examples of the present disclosure are briefly introduced. Obviously, the accompanying drawings are only one or more examples of the present disclosure. Those of ordinary skill in the art may further obtain other accompanying drawings based on these accompanying drawings without paying any creative work.

DETAILED DESCRIPTION OF THE EMBODIMENTS

Figure 1:
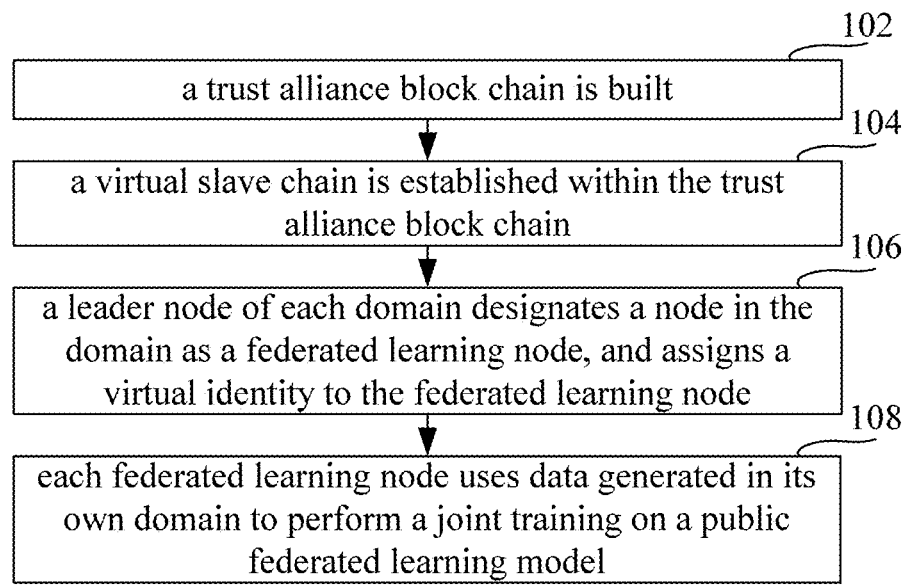
FIG. 1 is a schematic diagram illustrating a process of a data sharing method according to some examples of the present disclosure.

In order to make the objectives, technical solutions, and advantages of the present disclosure clearer, the present disclosure will be further described in detail with reference to specific examples described below together with the accompanying drawings.

It should be noted that, unless otherwise defined, the technical terms or scientific terms used in one or more examples of the present disclosure should have the ordinary meanings understood by persons with ordinary skills in the field of the present disclosure. The terms "first", "second" and the like used in one or more examples of the present disclosure do not indicate any order, quantity or importance, but are only used for distinguishing different constituent components. The terms "comprising" or "containing" and the like mean that the element or object appearing in front of the term covers the elements or objects and their equivalents listed after the term, without excluding other elements or objects. The terms such as "connection" or "connected" and the like are not limited to physical or mechanical connections, but may comprise electrical connections, regardless of direct connection or indirect connection. The terms "up", "down", "left", "right" and the like are only used for indicating the relative position relationship. When the absolute position of the described object changes, the relative position relationship may also change accordingly.

In order to solve the problem of data exposure or data leakage of existing data sharing methods, one or more examples of the present disclosure provide a data sharing method, which may realize data sharing in the IoT without data exposure, therefore the security of the data can be well guaranteed.

Generally speaking, for secure data sharing in the IoT, first, it is needed to ensure that the IoT environment is secure and trusted. Through certificate authentication and signature algorithms, the block chain may effectively defend against external network attacks, such as false identity attacks, anonymous attacks, and etc. Therefore, a secure and trusted IoT environment may be achieved by block chain technology.

In addition, in a multi-domain block chain, each slave chain of the block chain has its own private information. In order to avoid the leakage of the private information in cross-domain interactions, examples of the present disclosure introduce a virtual slave chain that does not contain any real entities for cross-domain interactions on the basis of a block chain. In view of the problem of private data exposure in the cross-domain interaction process, examples of the present disclosure use federated learning to establish a machine learning model and private data sharing may be achieved by sharing the machine learning model. In these examples, since sharing of the machine learning model obtained through federated learning replaces direct data sharing, data are not directly transmitted between any node, therefore, data exposure can be avoided.

Based on the above mentioned, examples of the present disclosure divide the IoT data sharing process into the following three main processes which are gradually implemented. First, a virtual slave chain based trust alliance block chain platform is built to guarantee the security of the IoT network layer architecture. Then, a cross-domain interaction channel supported by federated learning is established to realize an inter-domain communication environment without data interaction. Finally, data sharing in the cross-domain interaction channel can be completed depending on federated learning nodes in different domains.

Hereinafter, a data sharing method according to examples of the present disclosure will be described in detail below with reference to the accompanying drawings.

FIG. 1 is a schematic diagram illustrating a process of a data sharing method according to some examples of the present disclosure. As shown in FIG. 1, the method may include:

In block 102, a trust alliance block chain is built.

Figure 2:
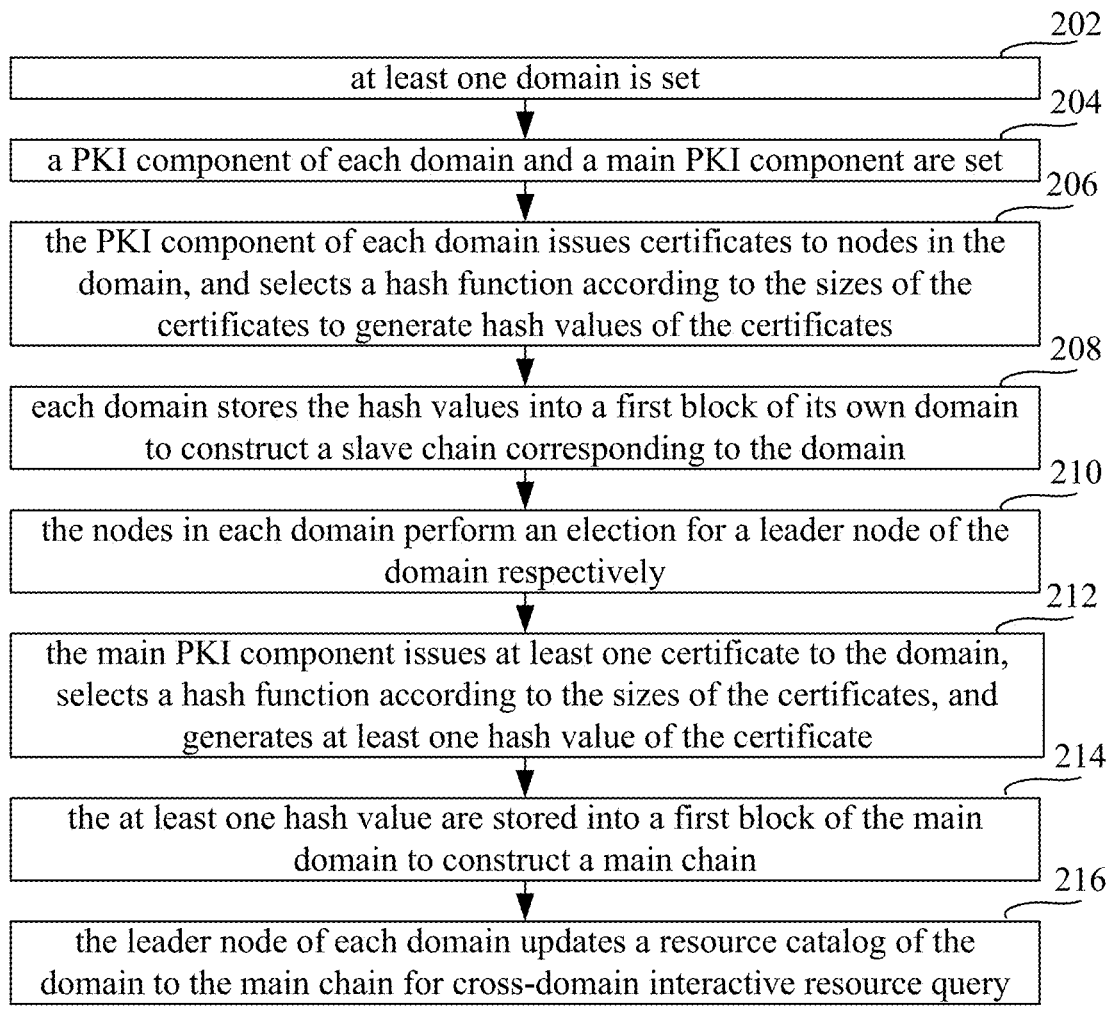
FIG. 2 is a schematic diagram illustrating a process of building a trust alliance block chain according to some examples of the present disclosure.

In some examples of the present disclosure, FIG. 2 may be referred to as a flowchart illustrating the building process of the trust alliance block chain, and the building process may specifically include the following steps:

In block 202, at least one domain is set.

According to one example of the present disclosure, the aforementioned domains may specifically refer to heterogeneous communication domains, such as communication domains for operators, Internet of Vehicles, etc. Specifically, the domains may refer to IBC (identity-based cryptography) domains. In the IBC domains, a PKI certificate is used as an identifier of each IBC domain.

In examples of the present disclosure, the at least one domain may be set according to geographic locations of IoT devices or actual IoT scenarios.

In block 204, a public key infrastructure (PKI) component of each domain and a main PKI component are set.

In block 206, the PKI component of each domain issues certificates to nodes in its own domain, and selects a hash function according to the sizes of the certificates to generate hash values of the certificates.

In block 208, each domain stores the hash values of the certificates into a first block of its own domain, so as to construct a slave chain corresponding to the domain.

In block 210, the nodes in each domain perform an election for a leader node of the domain respectively.

In block 212, the main PKI component issues at least one certificate to the at least one domain, selects a hash function according to the sizes of the at least one certificates, and generates at least one hash value of the at least one certificate.

In block 214, the at least one hash value of the at least one certificate are stored into a first block of the main domain to construct a main chain.

According to some examples of the present disclosure, the at least one slave chain and the main chain may construct a trust alliance block chain network.

In block 216, the leader node of each domain updates a resource catalog of the domain to the main chain for cross-domain interactive resource query.

Figure 3:
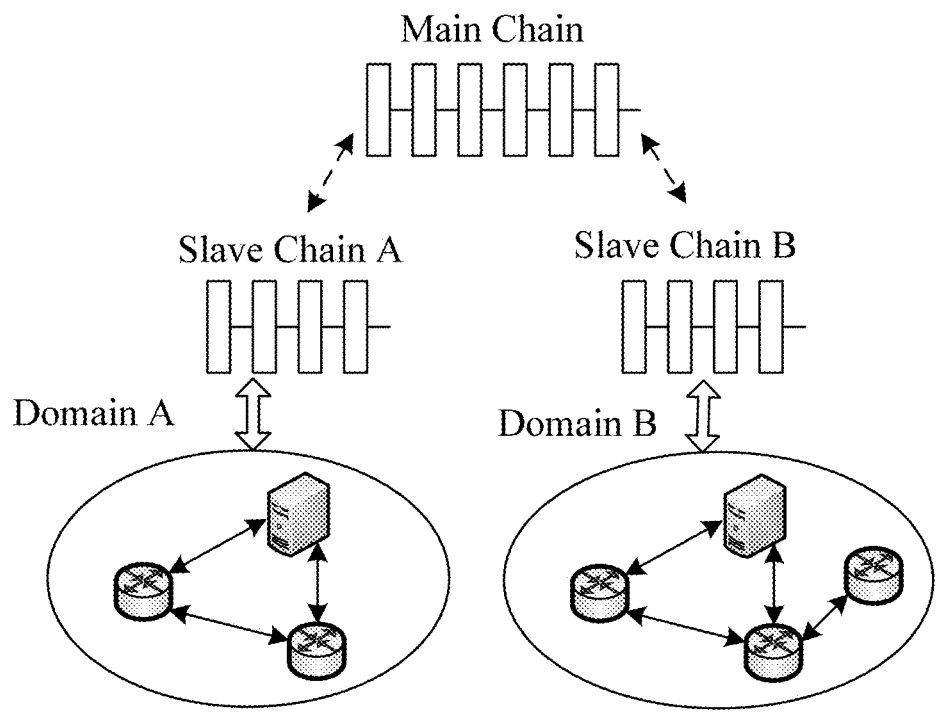
FIG. 3 is a schematic diagram illustrating a trust alliance block chain according to some examples of the present disclosure.

Through the above process, a trust alliance block chain may be established, and the building of a block chain based data security sharing platform is implemented. FIG. 3 is a schematic diagram illustrating a trust alliance block chain according to some examples of the present disclosure. As shown in FIG. 3, the trust alliance block chain comprises a main chain and at least one slave chain, wherein each slave chain corresponds to a domain.

In block 104, a virtual slave chain is established within the trust alliance block chain.

According to examples of the present disclosure, the trust alliance block chain with the virtual slave chain can provide a cross-domain data sharing environment.

In some examples of the present disclosure, in block 104, the virtual block chain within the trust alliance block chain may be established with the help of the main PKI component therein. Further, the virtual block chain is jointly managed by the leader nodes of all domains.

Specifically, the main PKI component may issue at least one certificate for at least one node of the virtual slave chain; and then select a hash function according to the size of the at least one certificate to generate at least one hash value of the at least one certificate; and finally, store the at least one hash value into a first block of the virtual block chain.

Figure 4:
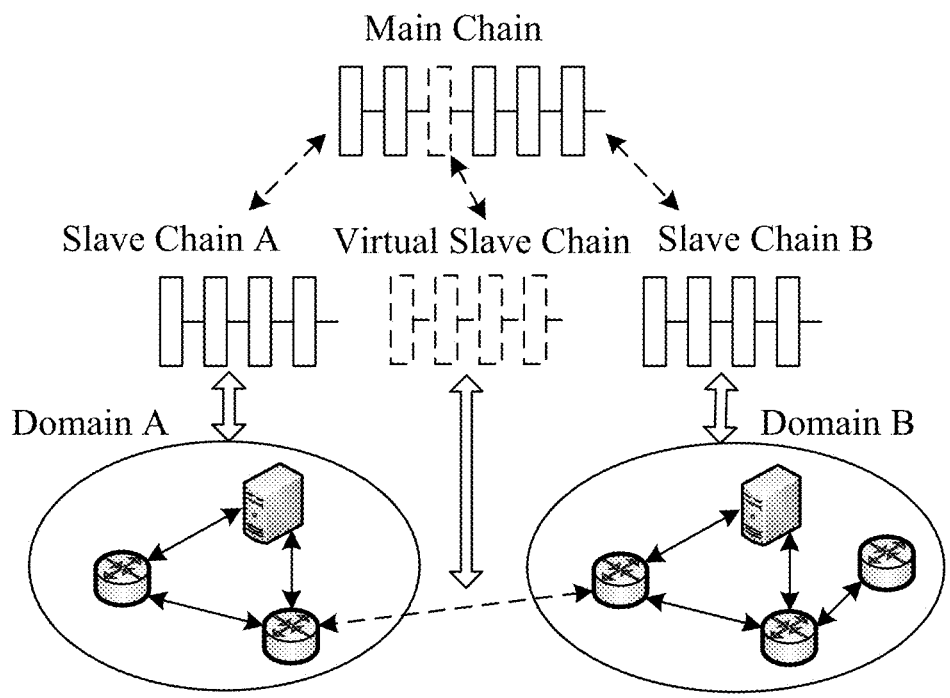
FIG. 4 is a schematic diagram of illustrating a trust alliance block chain with a virtual slave chain according to some examples of the present disclosure.

FIG. 4 is a schematic diagram of illustrating a trust alliance block chain with a virtual slave chain according to some examples of the present disclosure. As shown in FIG. 4, in addition to a main chain and at least one slave chain, the trust alliance block chain may further include a virtual slave chain. Except for the virtual slave chain, each slave chain corresponds to a domain.

In block 106, a leader node of each domain designates a node in the domain as a federated learning node of the domain, and assigns a virtual identity to the federated learning node to join the federated learning node to the virtual slave chain.

In some examples of the present disclosure, the step of assigning a virtual identity to the federated learning node of the domain may specifically include: the leader node of each domain issues a certificate corresponding to one node of the virtual slave chain and a corresponding hash value to the federated learning node of the domain. At this point, each federated learning node will have two identities: a node in its original domain (a node on the slave chain corresponding to the domain), and a node on the virtual slave chain.

In block 108, each federated learning node uses data generated in its own domain to perform a joint training on a public federated learning model.

Figure 5:
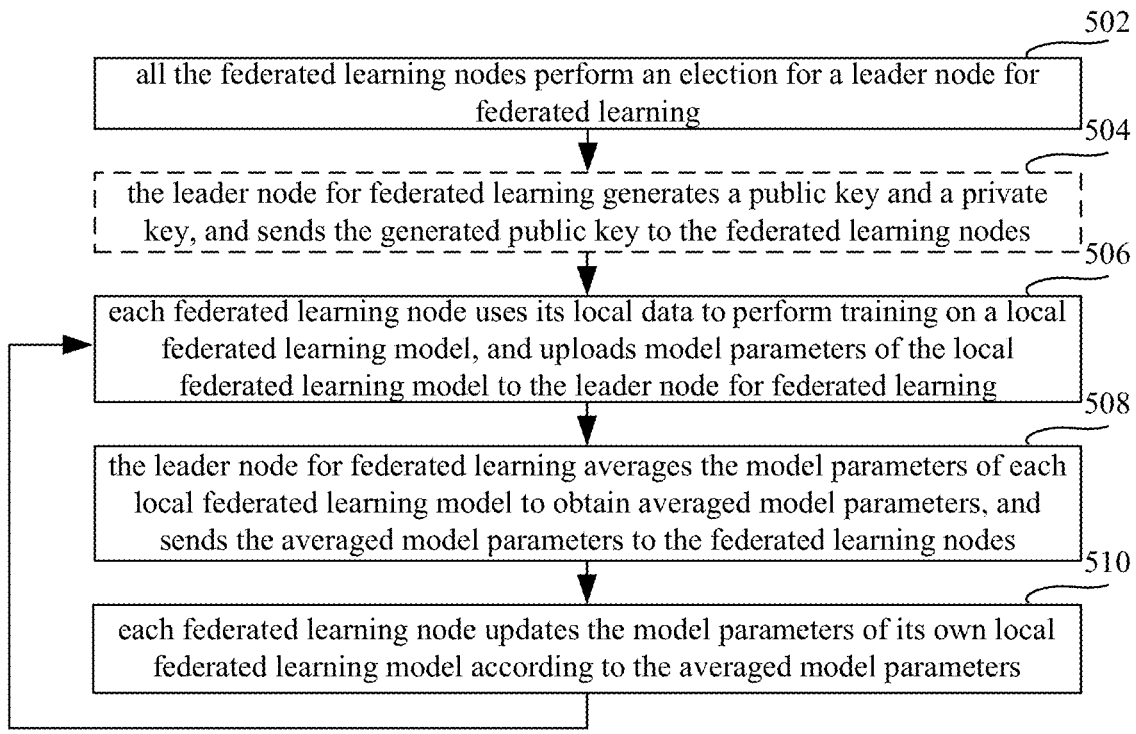
FIG. 5 is a schematic diagram illustrating a process of a joint training according to some examples of the present disclosure.

FIG. 5 is a schematic diagram illustrating a process of a joint training according to some examples of the present disclosure. As shown in FIG. 5, the joint training may include the following steps:

In block 502, all the federated learning nodes perform an election for a leader node for federated learning.

Figure 6:
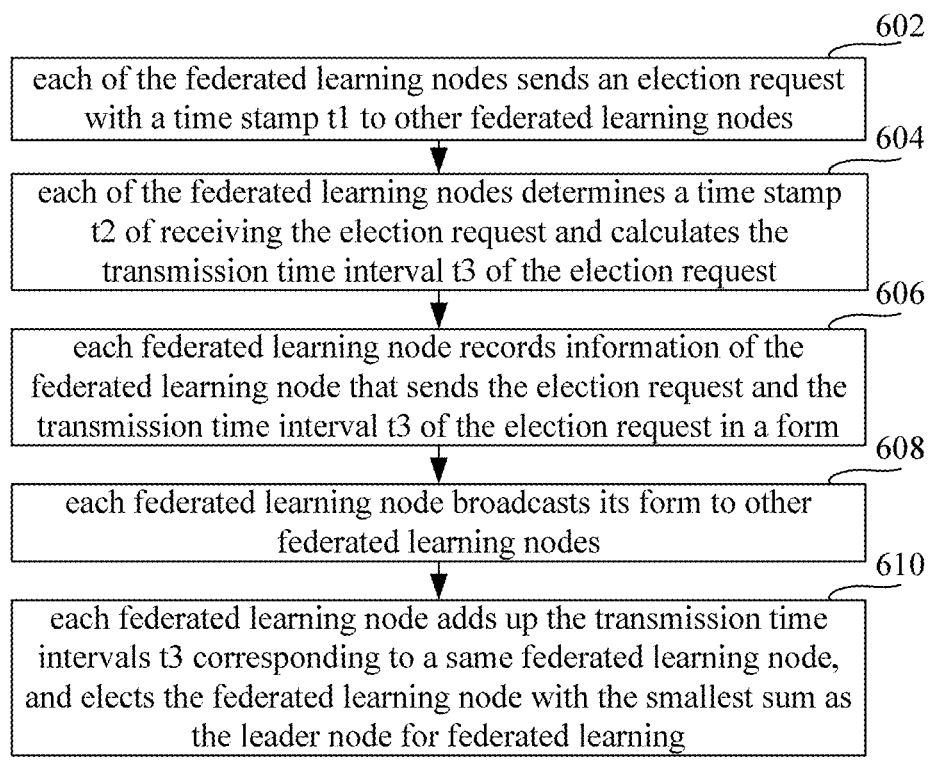
FIG. 6 is a schematic diagram illustrating a process of a leader election of all federated learning nodes according to some examples of the present disclosure.

FIG. 6 is a schematic diagram illustrating a process of leader election of all federated learning nodes according to some examples of the present disclosure. As shown in FIG. 6, the election process may include the following steps:

In block 602, each of the federated learning nodes sends an election request with a time stamp t1 to other federated learning nodes, wherein the time stamp t1 is the time of sending the election request.

In block 604, when receiving an election request from other federated learning nodes, each of the federated learning nodes determines a time stamp t2 of receiving the election request and calculates the transmission time interval t3 of the election request, where t3=t2−t1.

In block 606, each federated learning node records information of the federated learning node that sends the election request and the transmission time interval t3 of the election request in a form.

In block 608, after receiving the election requests of all other federated learning nodes, each federated learning node broadcasts its form to other federated learning nodes.

In block 610, after receiving the form, each federated learning node adds up the transmission time intervals t3 corresponding to a same federated learning node according to the records in the form, and elects the federated learning node with the smallest sum as the leader node for federated learning.

Further, in the above block 608, the federated learning node with the second smallest sum may further be used as a backup leader node for federated learning.

In block 504, the leader node for federated learning generates a public key and a private key, and sends the generated public key to the federated learning nodes.

To be noted, the above block 504 is only required when data transmitted between the federated learning nodes needs to be encrypted.

In some examples of the present disclosure, the leader node for federated learning may use a homomorphic encryption algorithm (Paillier) to generate the public key and the private key.

Specifically, the private key may be generated through the following process:

First, randomly selecting two large prime numbers p and q, which satisfy gcd(pq, (p−1)(q−1))=1, wherein gcd(pq, (p−1)(q−1)) represents the greatest common divisor of pq and (p−1)(q−1).

Second, calculating n=pq and λ=lcm(p−1, q−1).

Third, selecting a random integer g (g∈$Z_{n^2}^*$), so that the order of condition n divided by g may be satisfied, that is, gcd(L(g$^\lambda$mod n$^2$), n)=1, wherein lcm(p−1, q−1) represents the least common multiple of p−1 and q−1.

Finally, determining that the public key is (n, g) and the private key is λ.

After the public key and the private key are determined, the public key may be used for completing data encryption, and the private key may be used for completing data decryption.

Specifically, assuming that the plaintext is m, a random number r∈$Z_n$ is first selected. Then, the ciphertext c obtained after encrypting the above plaintext m may be expressed as follows: c=E(m, r)=g$^m$r$^n$mod n$^2$, r∈$Z_n$.

In addition, the ciphertext c may be decrypted by the following expression to obtain the plaintext m:

$$m = D(c, \lambda) = \left(\frac{L(c^\lambda \bmod n^2)}{L(g^\lambda \bmod n^2)}\right) \bmod n, \quad L(u) = u - 1/N.$$

In this step, the leader node for federated learning distributes the public key to the federated learning nodes, so that the federated learning nodes may use the received public key to perform encryption on the data that needs to be exchanged between domains during the training.

In block 506, each federated learning node uses its local data to perform training on a neural network model to obtain a local federated learning model, and uploads model parameters of the local federated learning model to the leader node for federated learning.

In some examples of the present disclosure, the model parameters should be encrypted with the public key before being sent to the leader node for federated learning.

Specifically, in some examples of the present disclosure, the neural network model may be a convolutional neural network (CNN), a deep neural network (DNN) or any other neural network models.

Furthermore, in some other examples of the present disclosure, before the neural network models are trained, the following steps may be further included:

In block 505, the leader node for federated learning collects data fields of data sets on each federated learning node, determines the data fields for federated learning and the order the data fields to generate an alignment result of the data sets, and issues the alignment result of the data sets to the federated learning nodes.

In this way, each federated learning node may determine which data fields in its own data sets should be used to train the local federated learning model and the order of these data fields according to the received alignment result of the data sets. That is, in this case, in block 506, each federated learning node may extract data of the corresponding data fields from the local data set based on the alignment result of the data sets, and then uses the extracted data to train the local federated learning model.

It should be noted that, in some examples of the present disclosure, aside from storing data sets generated by them, each federated learning node may further collect and store data sets generated by other nodes in its own domain.

In block 508, after receiving the model parameters from all the federated learning nodes, the leader node for federated learning averages the model parameters of each local federated learning model to obtain averaged model parameters, and sends the averaged model parameters to the federated learning nodes.

In block 510, each federated learning node updates the model parameters of its own local federated learning model according to the averaged model parameters; and then returns to block 506; and iterates the above process until the loss function of its local federated learning model converges.

In this way, after the above training process, the local federated learning model trained by each federated learning node would have the same model parameters. Therefore, these local federated learning models can be taken as a same neural network model, that is, a public federated learning model. That is, this training process is equivalent to that all the federated learning nodes jointly trained a public federated learning model with all their data shared with one another.

The entire joint training process is completed through the process as shown in FIG. 5 above. The public federated learning model obtained through the above training process establishes a cross-domain interaction channel supported by federated learning on the trust alliance block chain, and the interaction channel is a secure shared channel without data interaction.

After the joint training is completed and the model parameters of the public federated learning model are obtained, each federated learning node may distribute the model parameters of the public federated learning models to other nodes in its domain through the slave chains where the federated learning node are located. Thus, all nodes may share the same public federated learning model. In other subsequent applications, each node may directly use the public federated learning model to perform classification of various data, prediction or other applications, so as to realize the functions of various IoT applications.

As can be seen from the data sharing method that, in some examples of the present disclosure, each domain joins the federated learning nodes into the established virtual slave chain, and makes the federated learning nodes jointly train a public federated learning model through joint training. This public federated learning model is equivalent to a machine learning model trained while all the data of respective domains are shared. Using the public federated learning model by each domain in the application is equivalent to using all the data of all the domains, thereby achieving the effect of data sharing. Moreover, in the above process, data is not truly shared between each domain. Therefore, data exposure or leakage can be completely avoided, and the security of data can be guaranteed.

Specific examples of the data sharing method described in the examples of the present disclosure will be described in detail below with reference to the accompanying drawings. The application scenario of this example is IoT between brain-computer interface devices in intelligent medical care. The purpose of the example is to fuse a variety of EEG raw data collection scenarios, so as to establish a high-precision, wide-range and multi-scenario mapping model from brain-wave physiological signals to intentional behaviors of human brain. In order to achieve this goal, it is necessary to collect raw EEG physiological signal data in different application scenarios and perform reliable cross-domain interaction. However, the collected raw EEG signal data is the privacy of users and needs to be validly protected. Therefore, the examples provided in the present disclosure will construct a trust alliance block chain platform based on a virtual sub-chain, and establish a cross-domain interaction channel supported by federated learning, so as to enhance the reliability of cross-domain interaction of regional data on the platform. Specifically, only the parameters of a model are transmitted between different domains, thus the purpose of protecting raw training data can be achieved.

In examples provided by the present disclosure, unless otherwise specified, the PKI components all adopt basic settings and may be obtained by means of free and open sources. Unless otherwise specified, the contents of each block chain certificate may be set randomly, and the data format is an array with variable lengths.

Figure 7A:
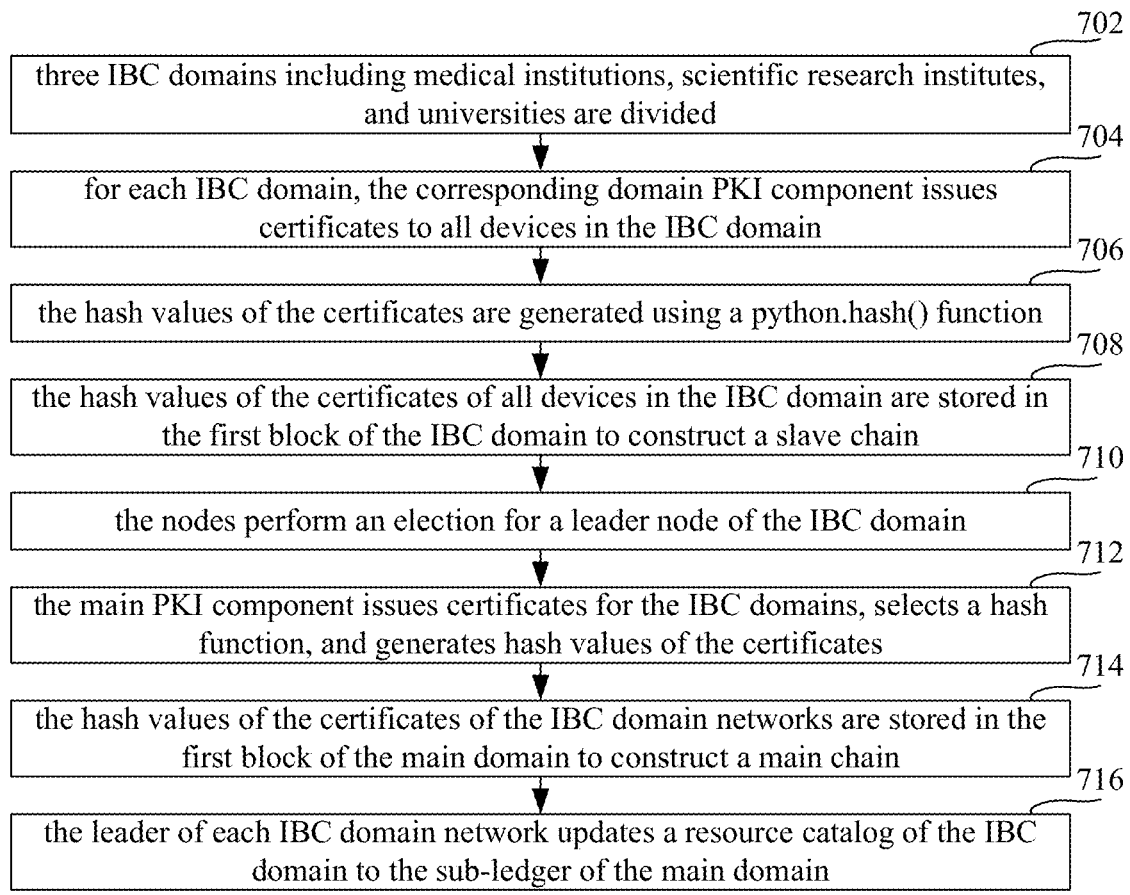
FIG. 7A, FIG. 7B and FIG. 7C are schematic diagrams illustrating a process of a specific example of the data sharing method according to some examples of the present disclosure.
Figure 7B:
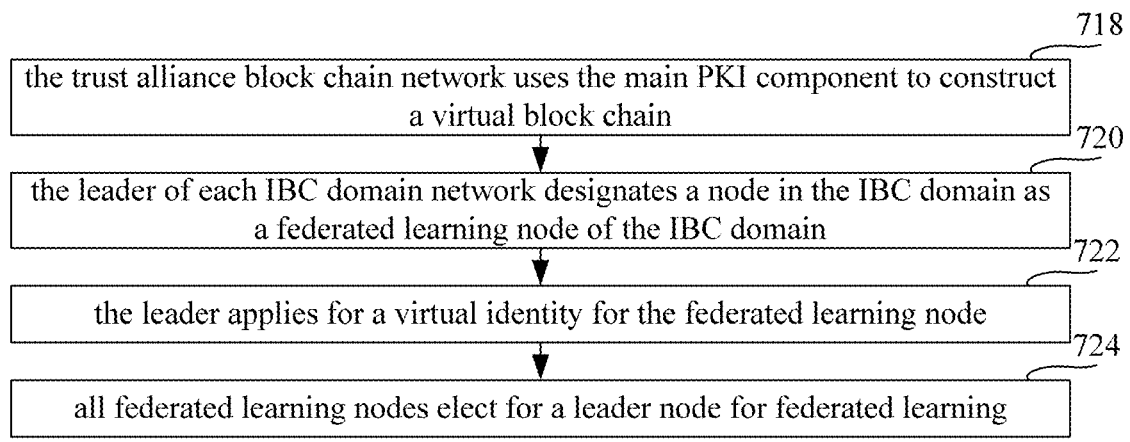
Figure 7C:
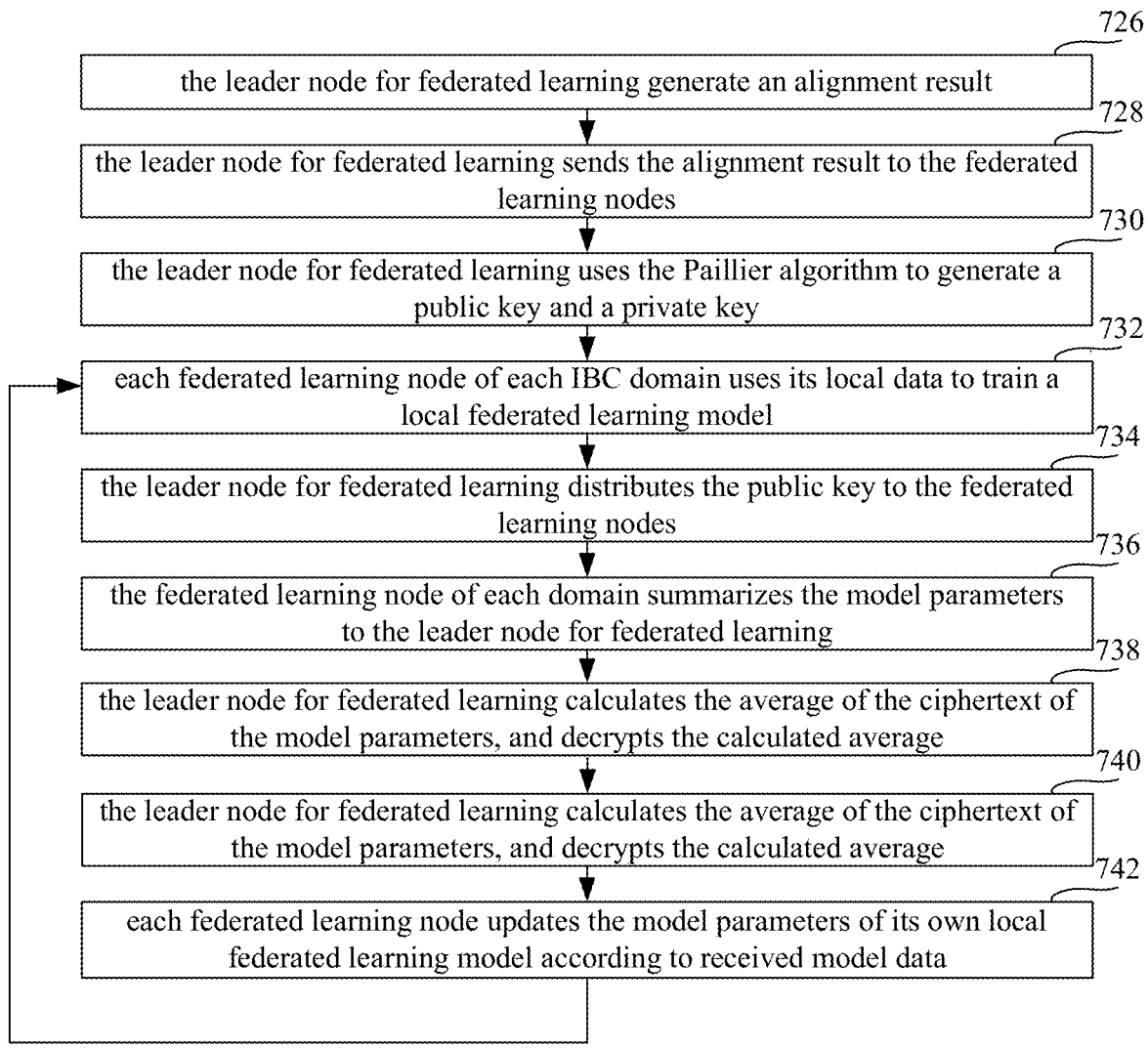

FIG. 7A, FIG. 7B and FIG. 7C are schematic diagrams illustrating a specific example of a data sharing method according to an example of the present disclosure.

FIG. 7A illustrates a first part of the example. As shown in FIG. 7A, the method may include the following steps.

In block 702, according to different scenarios for collection of raw data of a brain-computer interface, three IBC domains including medical institutions, scientific research institutes, and universities are divided.

For ease of description, in the texts below, the three domains are named Domain A, Domain B, and Domain C, respectively. Moreover, in the examples provided by the present disclosure, the numbers of sub-devices in the three IBC domains are 3, 4, and 3. For each IBC domain, a corresponding domain PKI component is arranged. For the entire trust alliance block chain platform, a main PKI component is arranged.

In block 704, for each IBC domain, the corresponding domain PKI component issues certificates to all devices in the IBC domain.

In some examples provided by the present disclosure, the contents of the certificates are shown in Table 1 below.

TABLE 1

|  | Domain A | Domain B | Domain C |
| --- | --- | --- | --- |
| Device 1 | 5056690400025 | 1128576852186 | 1698536245985 |
| Device 2 | 1245836985214 | 8821436874596 | 1243877682154 |
| Device 3 | 7851458963201 | 2714358740258 | 4673789641052 |
| Device 4 | None | 7814589301235 | None |

In block 706, the hash values of the certificates are generated using a python.hash( ) function.

In some examples provided by the present disclosure, the contents of the hash values are shown in Table 2 below.

TABLE 2

|  | Domain A | Domain B | Domain C |
| --- | --- | --- | --- |
| Device 1 | 1513894987 | 1147937511 | 2024164855 |
| Device 2 | 296469954 | 1721536367 | 484650541 |
| Device 3 | 258749769 | 2086894097 | 865225180 |
| Device 4 | None | 2043793449 | None |

In block 708, for each IBC domain, the hash values of the certificates of all devices in the IBC domain are stored in the first block of the IBC domain to construct a slave chain corresponding to the IBC domain, also called as an IBC domain network.

In block 710, for each IBC domain, the nodes of the IBC domain perform an election for a leader node of the IBC domain.

In some examples provided by the present disclosure, the results of elections for a leader node of the domains are: Domain A: Device 2; Domain B: Device 4; Domain C: Device 1.

In block 712, for each IBC domain, the main PKI component issues certificates for the IBC domain networks constructed in block 708, selects a hash function according to the sizes of the certificates, and generates hash values of the certificates.

In some examples provided by the present disclosure, the hash values of the certificates of the IBC domain networks are shown in Table 3 below.

TABLE 3

|  | Domain Network Certificates | Hash Values of Domain Network Certificates |
| --- | --- | --- |
| Domain A | 1563854312563 | 486217547 |
| Domain B | 1458648653241 | 507256928 |
| Domain C | 9865348564354 | 1956173683 |

In block 714, the hash values of the certificates of the IBC domain networks are stored in the first block of the main domain to construct a main chain.

Therefore, a trust alliance block chain network is established which includes a main chain and 3 slave chains.

In block 716, the leader of each IBC domain network updates a resource catalog of the IBC domain to the sub-ledger of the main domain for cross-domain interactive resource query.

By the above process, a trust alliance block chain network is established.

FIG. 7B illustrates a second part of the example. As shown in FIG. 7B, the method may include the following steps.

In block 718, the trust alliance block chain network uses the main PKI component to construct a virtual block chain.

The virtual block chain is jointly managed by Device 2 of Domain A, Device 4 of Domain B and Device 1 of Domain C, to construct a virtual sub-chain containing trust alliance block chain network.

In block 720, for each IBC domain network, the leader of each IBC domain network designates a node in the IBC domain as a federated learning node of the IBC domain.

In some examples provided by the present disclosure, the designated results of the leader of each IBC domain network are shown in Table 4 below:

TABLE 4

|  | Domain Leader Node | Federated Learning Node |
| --- | --- | --- |
| Domain A | Device 2 | Device 3 |
| Domain B | Device 4 | Device 4 |
| Domain C | Device 1 | Device 2 |

In block 722, for each IBC domain, the leader applies for a virtual identity for the federated learning node.

In block 724, in the trust alliance block chain network, all federated learning nodes jointly perform an election for a leader node for federated learning.

The detailed steps of the election are as follows:

Each federated learning node sends an election request with a time stamp t1 to other federated learning nodes, wherein the time stamp records the time of sending the request.

In some examples provided by the present disclosure, the contents of the election requests sent by each federated learning node to other nodes are shown in Table 5 below:

TABLE 5

|  | Time Stamp t1 | Contents of Election Requests |
| --- | --- | --- |
| Device 3 of Domain A | 202009181546 | 2020091815460326 |
| Device 4 of Domain B | 202009181547 | 2020091815470326 |
| Device 2 of Domain C | 202009181540 | 2020091815400326 |

For each federated learning node, when receiving an election request from another federated learning node, recording the time of receiving the request as a time stamp t2. Let t3=t2−t1, and recording the information of the requesting node and t3 in a form.

In one embodiment provided by the present disclosure, the recorded forms of Domain A, Domain B, and Domain C are as shown in Tables 6, 7 and 8 below:

TABLE 6

| Domain A | | | |
| --- | --- | --- | --- |
| Requesting Node | t1 | t2 | t3 |
| Device 4 of Domain B | 202009181547 | 202009181557 | 10 |
| Device 2 of Domain C | 202009181540 | 202009181543 | 3 |

TABLE 7

| Domain B | | | |
| --- | --- | --- | --- |
| Requesting Node | t1 | t2 | t3 |
| Device 3 of Domain A | 202009181546 | 202009181558 | 12 |
| Device 2 of Domain C | 202009181540 | 202009181546 | 6 |

TABLE 8

| | Domain C | | |
|---|---|---|---|
| Requesting Node | t1 | t2 | t3 |
| Device 3 of Domain A | 202009181546 | 202009181551 | 5 |
| Device 4 of Domain B | 202009181547 | 202009181549 | 2 |

After receiving the requests of all the federated learning nodes, all the federated learning nodes broadcast forms recorded by themselves to other federated learning nodes of the entire domain.

After receiving the forms, each federated learning node adds up the t3 of the corresponding nodes in the forms; and the node with the smallest sum becomes a leader node for federated learning. In one embodiment provided by the present disclosure, the sum of t3 of Device 3 in Domain A is 12+5=17; the sum of t3 of Device 4 in Domain B is 10+2=12; and the sum of t3 of Device 2 in Domain C is 3+6=9. Therefore, Device 2 in Domain C is selected as the leader node for federated learning.

By the above process, a trust alliance block chain network with a virtual slave chain is established.

FIG. 7C illustrates a third part of the example. As shown in FIG. 7C, the method may include the following steps.

In block 726, Device 2 in Domain C (i.e., the leader node for federated learning) collects the data fields of to-be-trained data sets of each federated learning node and performs data transformation and data reduction to unify data fields used by all parties and the order thereof to generate an alignment result of the data sets.

In block 728, Device 2 in Domain C (i.e., the leader node for federated learning) sends the alignment result of block 726 to other federated learning nodes.

In block 730, Device 2 in Domain C (i.e., the leader node for federated learning) uses the Paillier algorithm to generate a public key and a private key. The specific steps are as follows:

First, let p=541 and q=373, obviously gcd(pq, (p−1)(q−1))=1 is satisfied.

Calculate n=pq=541*373=201793.

Calculate λ=lcm(p−1, q−1)=lcm(540,372)=200880.

Then choose a random integer g=96335.

In this case, determine that the public key is (201793, 96335) and the private key is 200880. Further, the following condition is satisfied: gcd(L($g^\lambda$mod$n^2$), n)=0.00016118633139909736.

After determining the public key and the private key, using the public key to complete encryption, and using the private key to complete decryption.

In block 732, each of Device 3 in Domain A, Device 4 in Domain B and Device 2 in Domain C (i.e., each federated learning node of each IBC domain) use its local data to train a local federated learning model, respectively.

In block 734, Device 2 in Domain C (i.e., the leader node for federated learning) distributes the public key (201793, 96335) to the federated learning node of each IBC domain to encrypt data that needs to be exchanged in the training process.

Specifically, when the plaintext is m, a random number $r \in Z_n$ is selected, and the ciphertext c may be obtained:

$$c = E(m,r) = g^m r^n \bmod n^2, r \in Z_n$$

In block 736, the federated learning node of each domain summarizes the model parameters of the local federated learning model to Device 2 in Domain C (i.e., the leader node for federated learning) in the form of ciphertext.

In block 738, Device 2 in Domain C (i.e., the leader node for federated learning) calculates the average of the ciphertext of the model parameters, and decrypts the calculated average.

Specifically, when the ciphertext is c, the plaintext content m may be obtained by decryption:

$$m = D(c, \lambda) = \left( \frac{L(c^\lambda \bmod n^2)}{L(g^\lambda \bmod n^2)} \right) \bmod n, \; L(u) = u - 1/N$$

In block 740, Device 2 in Domain C (i.e., the leader node for federated learning) sends the decrypted model data back to the federated learning nodes.

In block 742, each federated learning node updates the model parameters of its own local federated learning model according to received model data.

Iterating steps 732-742 until the model precision of each domain meets the requirements, and now that the entire training process is completed.

In examples of the present disclosure, after experimental tests, the trained mapping model from brainwave physiological signals to intentional behaviors of human brain has an accuracy rate up to 87.1%, 86.4%, and 81.2% under various application scenarios, respectively. At the meantime, the privacy of users is well protected, and the security and reliability of interaction are improved.

Figure 8:
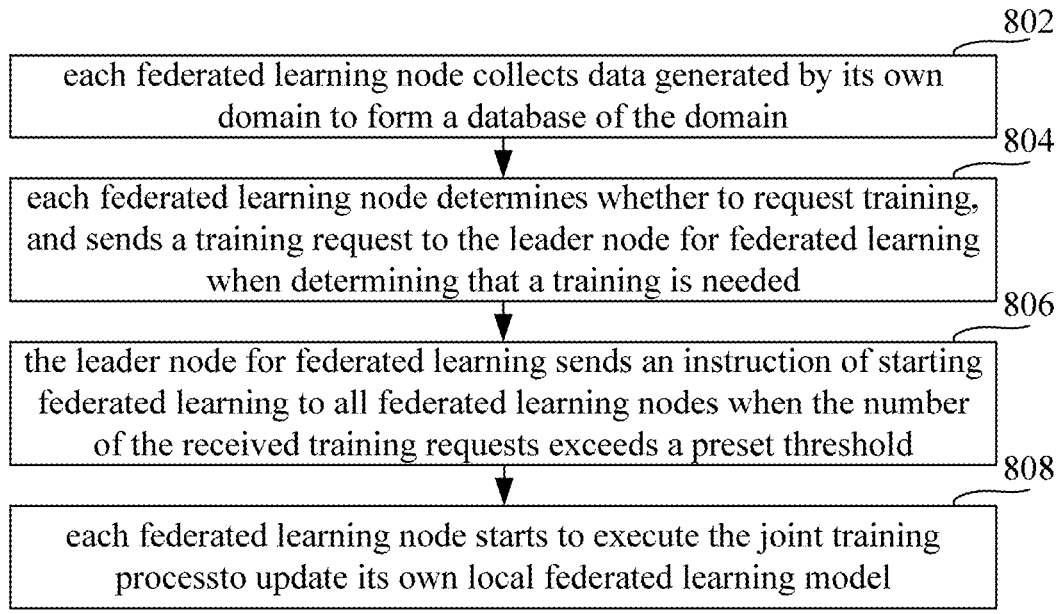
FIG. 8 is a schematic diagram illustrating an update process of a public federated learning model according to some examples of the present disclosure.

Furthermore, since each domain will constantly generate new data in the implementation process of the IoT applications. In order to realize timely data sharing between respective domains, it is necessary to further timely update the trained local federated learning models based on the data sharing method. The update process of the local federated learning models may be shown in FIG. 8, which may include:

In block 802, each federated learning node collects data generated by its own domain to form a database of the domain.

In block 804, each federated learning node determines the training factors of its own domain according to the amount of data generated in the domain, determines whether to request training according to the training factors, and sends a training request to the leader node for federated learning when determining that a training is needed.

Specifically, in examples of the present disclosure, the training factor Z may be determined by the following expression:

$$Z = \frac{ndata}{data},$$

where, ndata represents the amount of data generated in its own domain, and data represents the total amount of data.

In addition, a training threshold of the request may be preset, and whether to request training is determined according to the relationship between the training factor and the training threshold of the request. For example, when it is determined to request training, the federated learning node sends a training request to the leader node for federated learning; otherwise, the federated learning node may continue collecting data.

In block 806, the leader node for federated learning receives training requests, and sends an instruction of starting federated learning to all federated learning nodes when the number of the received training requests exceeds the preset threshold of the number of the requests.

In block 808, after receiving the instruction of starting federated learning, each federated learning node starts to execute the joint training process of blocks 506-510 to update its own local federated learning models.

With the method described above, joint training may be performed again when the newly generated data in each domain exceeds certain conditions, so as to obtain an updated local federated learning model, thereby realizing timely data sharing between respective domains.

Corresponding to the data sharing method, the embodiment of the present disclosure further provides a data sharing system. The interior structure of the data sharing system may be as shown in FIG. 4, mainly comprising: a trust alliance block chain and a virtual slave chain; wherein the trust alliance block chain comprises a main chain and at least one slave chain, each slave chain corresponds to one domain, and each domain comprises a leader node therein.

The leader node in each domain designates a node in its own domain as a federated learning node of the domain, assigns a virtual identity to the federated learning node of the domain, and joins the federated learning node to the virtual slave chain.

Each federated learning node uses data generated in its own domain to perform a joint training on a public federated learning model, and use the public federated learning model to complete data sharing between different domains.

According to some examples of the data sharing system, each federated learning node performs an election for a leader node for federated learning; performs a training on a neural network model to obtain the local federated learning model using its local data; and uploads model parameters of the local federated learning model to the leader node.

Further, the leader node for federated learning averages the model parameters of the local federated learning models; and sends averaged model parameters to the federated learning nodes.

Then, each federated learning node updates the model parameters of its local federated learning model according to the averaged model parameters; and returns to the step of performing a training on the neural network model and iterates the above process until a loss function of the local federated learning model converges.

According to some examples of the data sharing system, the data sharing system may further comprise: a main PKI component; wherein the main PKI component issues at least one certificate for at least one virtual node of the virtual slave chain; selects a hash function according to the size of the at least one certificate to generate at least one hash value for the at least one certificate; and stores the at least one hash value into a first block of the at least one virtual node to construct the virtual slave chain.

According to some examples of the data sharing system, the leader node in each domain issues one certificate of the at least one certificate and the corresponding hash value to the federated learning node.

According to some examples of the data sharing system, each federated learning node further collects data generated by its own domain to form a database of the domain; determines training factors of its own domain according to the amount of data generated in the domain; determines whether to request training according to the training factors; and sends a training request to the leader node for federated learning when determining that a training is needed; and performs a training on the neural network model using data generated in its own domain to update the public federated learning model after receiving an instruction of starting federated learning.

It should be noted that, the method in one or more examples of the present disclosure may be executed by a single device, such as a computer, a server or the like. The method may be applied in a distributed scenario, and is completed by more than one device through cooperation with each other. In this distributed scenario, one of the devices may only execute one or more steps of the method in one or more examples of the present disclosure, and these devices would perform interaction each other to complete the method.

The foregoing describes specific examples of the present disclosure. Other examples are within the scope of the appended claims. In some cases, actions or steps described in the claims may be executed in a sequence different from the sequence in the examples and may still achieve desired results. In addition, the processes depicted in the accompanying drawings may achieve the desired results without necessarily following the shown specific sequence or successive sequence. In some examples, multitasking and parallel processing are also possible or may be advantageous.

For ease of description, when the above-mentioned devices are described, various modules are divided according to the functions and described separately. Definitely, when one or more examples of the present disclosure are implemented, the functions of respective modules may be implemented in one or more software and/or hardware.

The devices in the examples are used to implement the corresponding methods in the foregoing examples, and has the beneficial effects of the corresponding method examples, which are not described here.

Figure 9:
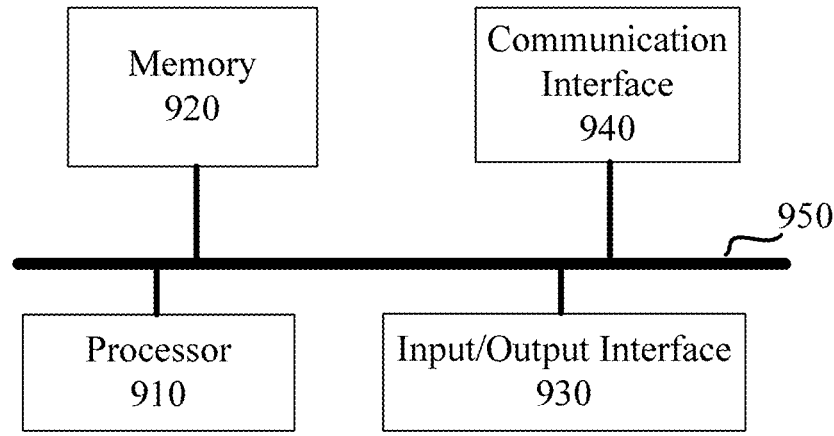
FIG. 9 is a schematic diagram illustrating an internal structure of an electronic device according to some examples of the present disclosure.

FIG. 9 is a schematic diagram of a more specific hardware structure of an electronic device provided by the embodiment of the present disclosure. The device may comprise: a processor 910, a memory 920, an input/output interface 930, a communication interface 940, and a bus 950, wherein the processor 910, the memory 920, the input/output interface 930 and the communication interface 940 realize communication connection with each other in the device through the bus 950.

The processor 910 may be implemented by a general CPU (Central Processing Unit), a microprocessor, an ASIC (Application Specific Integrated Circuit), one or more integrated circuits or the like for executing related programs, so as to realize the data sharing method provided by the examples of the present disclosure.

The memory 920 may be implemented by ROM (Read Only Memory), RAM (Random Access Memory), a static storage device, a dynamic storage device or the like. The memory 920 may store operating systems and other application programs. When the data sharing method provided in the examples of the present disclosure is implemented through software or firmware, related program codes are stored in the memory 920 and are called to be executed by the processor 910.

The input/output interface 930 is used to connect an input/output module to realize input and output of the information. The input/output module may be configured in the device as a component (not shown in the drawing), or may be externally connected to the device to provide corresponding functions, wherein an input device may comprise a keyboard, a mouse, a touch screen, a microphone, various sensors, etc., and an output device may comprise a display, a loud speaker, a vibrator, an indicator light, etc.

The communication interface 940 is used to connect a communication module (not shown in the drawing) to implement communication interaction between the said device and other devices, wherein the communication module may realize communication in a wired manner (such as USB, network cable, etc.), or in a wireless manner (such as mobile network, WIFI, Bluetooth, etc.).

The bus 950 comprises a path to transmit information between various components (for example, the processor 910, the memory 920, the input/output interface 930, and the communication interface 940) of the device.

It should be noted that, although the processor 910, the memory 920, the input/output interface 930, the communication interface 940, and the bus 950 of the device are only illustrated, in the specific implementation process, the device may further comprise other components that are necessary to realize normal operation. Furthermore, it can be understood by those skilled in the art that the device may merely comprise components that are necessary to implement the solutions of the examples of the present disclosure, and may unnecessarily comprise all the components shown in the drawings.

The computer-readable medium of the present embodiment comprises permanent and non-permanent media, and removable and non-removable media, which may realize information storage by any method or technology. The information may include computer-readable instructions, data structures, program modules or other data. Examples of computer storage media include, but are not limited to, phase change random access memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), digital versatile disc (DVD) or other optical storage, magnetic cassettes, magnetic tape and magnetic disk storage or other magnetic storage devices or any other non-transmission media, which may be used to store information that can be accessed by computing devices.

It should be understood by those of ordinary skill in the art that: the above-described examples discussed are only exemplary, and are not intended to imply that the scope of the present disclosure (including the claims) is limited to these examples; under the idea of the present disclosure, the above-described examples or technical features in different examples may be combined, the steps may be implemented in any order, and many other changes in different aspects of one or more examples of the present disclosure as described above may exist, which are not provided in details for the sake of conciseness.

Furthermore, in order to simplify the description and discussion and easily understand one or more examples of the present disclosure, the accompanying drawings provided may or may not show the known power/ground connection with integrated circuit (IC) chips and other components. In addition, the devices may be shown in the form of a block diagram in order to avoid making one or more examples of the present disclosure difficult to understand, and the following facts are taken into account, that is, the details of the implementing modes of these block diagram devices are highly dependent on the platforms on which one or more examples of the present disclosure will be implemented (i.e., these details should be fully within the understanding of those skilled in the art). In the case where specific details (for example, circuits) are explained to describe exemplary examples of the present disclosure, it is obvious for those skilled in the art that one or more examples of the present disclosure may be implemented without these specific details or when these specific details are changed. Therefore, these descriptions are to be construed as illustrative rather than limiting.

Although the present disclosure has been described by way of specific examples, based on the foregoing description, many substitutions, modifications and variations of these examples will be apparent to those of ordinary skill in the art. For example, other memory architectures (e.g., dynamic RAM (DRAM)) may use the discussed examples.

One or more examples of the present disclosure are intended to cover all such substitutions, modifications and variations that fall within the broad scope of the appended claims. Therefore, within the spirit and principle of one or more examples of the present disclosure, any omissions, modifications, equivalent substitutions, improvements and the like should be included within the scope of the protection of the present disclosure.

What is claimed is:

1. A data sharing method, comprising:
    building a trust alliance block chain, the trust alliance block chain comprising a main chain and at least one slave chain; each slave chain corresponding to a domain; and each domain comprising a leader node;
    establishing a virtual slave chain on the trust alliance block chain;
    designating, by the leader node in each domain, a node of its own domain as a federated learning node;
    assigning, by the leader node in each domain, a virtual identity to the federated learning node to join the federated learning node to the virtual slave chain; and
    performing, by each federated learning node, a joint training on a local federated learning model using data generated in its own domain to establish a public federated learning model, through which data are shared among the domains.

2. The method of claim 1, wherein, building a trust alliance block chain according to geographic locations of IoT devices comprises:
    setting at least one domain;
    setting a public key infrastructure (PKI) component for each domain and a main PKI component;
    within each domain, issuing, by the PKI component, certificates to all nodes in the domain, selecting a hash function according to the sizes of the certificates, generating hash values for the certificates, and storing the hash values into a first block of the domain to construct the slave chain corresponding to the domain;
    performing, by the nodes in each domain, an election for a leader node of each domain;
    issuing, by the main PKI component, a certificate for each domain, selecting a hash function according to the size of each certificate, generating a hash value for each domain, and storing the hash value of each domain into a first block of the main domain to construct the main chain; and
    updating, by the leader node of each domain, a resource catalog of its own domain to the main chain for cross-domain interactive resource query.

3. The method of claim 1, wherein, establishing a virtual slave chain on the trust alliance block chain comprises:
    issuing, by the main PKI component, at least one certificate for at least one virtual node of the virtual slave chain;

selecting a hash function according to the size of the at least one certificate to generate at least one hash value for the at least one certificate; and storing the at least one hash value into a first block of the at least one virtual node to construct the virtual slave chain.

4. The method of claim 3, wherein, assigning a virtual identity to the federated learning node comprises: issuing one certificate of the at least one certificate and the corresponding hash value to the federated learning node.

5. The method of claim 1, wherein, performing a training on a local federated learning model using data generated in its own domain comprises:

performing, by each federated learning node, an election for a leader node for federated learning;

performing, by each federated learning node, a training on a neural network model to obtain the local federated learning model using its local data;

uploading, by each federated learning node, model parameters of the local federated learning model to the leader node;

averaging, by the leader node for federated learning, the model parameters of the local federated learning models;

sending, by the leader node for federated learning, averaged model parameters to the federated learning nodes; and updating, by each federated learning node, the model parameters of its local federated learning model according to the averaged model parameters; and returning the step of performing a training on the neural network model and iterating the above process until a loss function of the local federated learning model trained by each federated learning node converges.

6. The method of claim 5, further comprising:

generating, by the leader node for federated learning, a public key and a private key;

sending, by the leader node for federated learning, the public key to the federated learning nodes;

encrypting, by each federated learning node, the model parameters with the public key before sending; and decrypting, by the leader node for federated learning, the averaged model parameters with the private key before sending.

7. The method of claim 6, wherein, generating a public key and a private key comprises:

randomly selecting two large prime numbers p and q, which satisfy gcd(pq, (p−1)(q−1))=1, wherein gcd(pq, (p−1)(q−1)) represents the greatest common divisor of pq and (p−1)(q−1);

calculating n=pq and $\lambda$=lcm(p−1, q−1);

selecting a random integer g ($g \in Z_{n^2}^*$), so that the order of condition n divided by g may be satisfied, that is, gcd(L($g^\lambda$mod$n^2$), n)=1, wherein lcm(p−1, q−1) represents the least common multiple of p−1 and q−1; and determining that the public key is (n, g) and the private key is $\lambda$.

8. The method of claim 7, wherein, the encrypting comprises:

assuming that a plaintext is m;

selecting a random number $r \in Z_n$; and obtaining a ciphertext c by encrypting the plaintext m according to the following expression:

$c=E(m,r)=g^m r^n \bmod n^2, r \in Z_n$.

9. The method of claim 8, wherein, the decrypting comprises:

decrypting the ciphertext c by the following expression to obtain the plaintext m:

$$m = D(c, \lambda) = \left(\frac{L(c^\lambda \bmod n^2)}{L(g^\lambda \bmod n^2)}\right) \bmod n, L(u) = u - 1/N.$$

10. The method of claim 5, wherein, performing an election for the leader node comprises:

sending, by each federated learning node, an election request with a time stamp t1 to other federated learning nodes, wherein the time stamp t1 is the time of sending the election request;

determining, by each federated learning node, a time stamp t2 of receiving the election request when receiving election requests from other federated learning nodes;

calculating, by each federated learning node, transmission time interval t3 of each election request;

recording, by each federated learning node, information of each federated learning node and the transmission time interval t3 of the election request sent by the federated learning node in a form;

broadcasting, by each federated learning node, the form recorded to other federated learning nodes; and adding up, by each federated learning node, the transmission time intervals t3 corresponding to a same federated learning node according to the records in the form received; and determining, by each federated learning node, the federated learning node with the smallest sum as the leader node for federated learning.

11. The method of claim 5, further comprising:

collecting, by the leader node for federated learning, fields of data sets of each federated learning node;

determining, by the leader node for federated learning, fields for federated learning and an order of the fields to generate an alignment result of the data sets; and sending, by the leader node for federated learning, the alignment result of the data sets to the federated learning nodes.

12. The method of claim 1, further comprising:

collecting, by each federated learning node, data generated by its own domain to form a database of the domain;

determining, by each federated learning node, training factors of its own domain according to the amount of data generated in the domain;

determining, by each federated learning node, whether to request training according to the training factors;

sending, by each federated learning node, a training request to the leader node for federated learning when determining that a training is needed; and performing, by each federated learning node, a training on the local federated learning model using data generated in its own domain to update the public federated learning model after receiving an instruction of starting federated learning.

13. The method of claim 12, further comprising:

receiving, by the leader node for federated learning, training requests;

sending, by the leader node for federated learning, the instruction of starting federated learning to all federated learning nodes when the number of training requests received exceeds a preset threshold.

14. An electronic device, comprising: a memory, a processor, and a computer program stored in the memory and running in the processor, wherein the processor implements the data sharing method of claim 1 when executing the program.

15. A non-transitory computer-readable storage medium, wherein the non-transitory computer-readable storage medium stores computer instructions, and the computer instructions being used to make the computer execute the data sharing method of claim 1.

\* \* \* \* \*